Sept. 2, 1969   W. C. PELLETT, SR   3,464,385
METHOD OF AND APPARATUS FOR ENHANCING SALMON SPAWNING
Filed Nov. 22, 1967
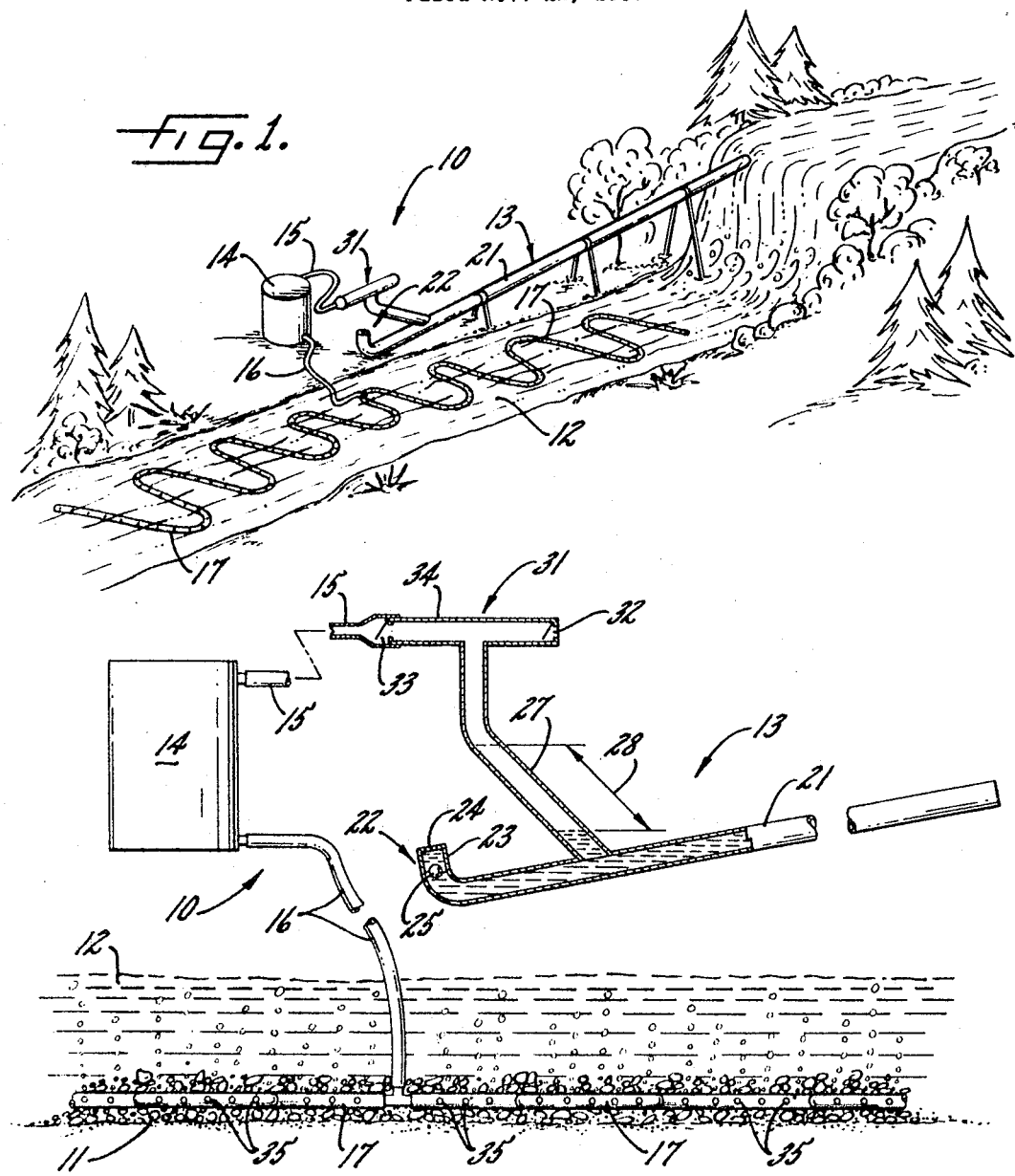
INVENTOR.
WARREN C. PELLETT, SR.
BY
Wolfe, Hubbard, Voit & Osann
ATTORNEYS.

United States Patent Office 3,464,385
Patented Sept. 2, 1969

3,464,385
METHOD OF AND APPARATUS FOR ENHANCING SALMON SPAWNING
Warren C. Pellett, Sr., Box 394, Sitka, Alaska 99835
Filed Nov. 22, 1967, Ser. No. 684,990
Int. Cl. A01k 61/00; F04f 7/02
U.S. Cl. 119—3
6 Claims

ABSTRACT OF THE DISCLOSURE

A method of rehabilitating salmon spawning streams by bubbling air up through the gravel of the stream bed from a plurality of points spaced throughout the treated area. Air under pressure is generated by a simple hydraulic ram utilizing the natural flow of the stream.

DESCRIPTION OF THE INVENTION

This invention relates generally to fishery practices and more particularly concerns treatment of salmon spawning streams.

Salmon return to fresh water streams to spawn. It has been observed that logging the watershed of salmon spawning streams adversely affects the salmon population. The disturbed watershed badly silts the gravel of the stream bed and the normal salmon spawning environment is altered, if not destroyed.

Various methods for reconditioning the stream beds have been proposed, such as washing the stream bed with jets of water, terracing the beds, and adding clean screened gravel, but these procedures have proved costly and of limited effectiveness.

Accordingly, it is the primary aim of the invention to provide the method of rehabilitating salmon population by adding oxygen to offset silt suffocation. A corollary object of the invention is to add oxygen in such a way to help cleanse the gravel in salmon spawning stream beds.

Another object is to provide apparatus for the method referred to above which is economical to install and economical to operate. A related object is to provide an apparatus as characterized above which is very dependable in operation, requiring little maintenance or field supervision.

Other objects and advantages of the invention will become apparent upon reading the following detailed description and upon reference to the drawings, in which:

FIG. 1 is a perspective of an apparatus embodying the invention as installed in a stream; and FIG. 2 is an enlarged, fragmentary, and partially sectioned elevation of the apparatus and installation shown in FIG. 1.

While the invention will be described in connection with a preferred embodiment and procedure, it will be understood that I do not intend to limit the invention to that embodiment or procedure. On the contrary, I intend to cover all alternatives, modifications and equivalents as may be included within the spirit and scope of the invention as defined by the appended claims.

Turning to the drawing, there is shown an apparatus 10 embodying the invention installed to treat the gravel bed 11 of a salmon spawning stream 12. The apparatus 10 includes a hydraulic ram 13 for generating a supply of air under greater than atmospheric pressure, an air accumulator tank 14 and air hose conduits 15 and 16 for directing the air to a point beneath the gravel stream bed, and a length of perforated pipe 17 for bubbling the air up through the gravel bed 11 from a plurality of closely spaced points.

The method of the invention thus involves bubbling air up through the gravel bed of a salmon spawning stream, with the air being generated, at least in part, from the natural flow of water in the stream itself. The air bubbles aerate the stream bed, adding oxygen to the natural water environment of the salmon eggs and fry—a period of salmon growth and development during which adequate oxygen is a critical requirement. The air bubbles also tend to dislodge suffocating silt so that silt particles can be carried away downstream by the natural flow of water. The practice of the method therefore adds oxygen over the treated area, which is critical to salmon development, and also acts to alleviate excessive siltation as caused by logging the watershed for the stream.

In carrying out the invention, the hydraulic ram 13 is formed by a long pipe 21 inclined downwardly in the downstream direction. In a typical installation, a forty-foot long pipe having a four-inch diameter and being set at an angle of about nine degrees from the horizontal has proved effective. The higher or upstream end of the pipe 21 is positioned to receive water from the stream 12. If the natural drop of the stream path does not give the full required water head, as in the illustrated installation, any simple water-lifting device can be utilized. The water input is simply spilled into the pipe 21.

A check valve 22 is provided at the lower, downstream end of the pipe 21. Preferably, the check valve 22 consists of an upturned portion 23 of the pipe 21 having an upwardly opening valve port 24, and a resilient ball 25 loosely captured in the portion 23 and sized to seal the port 24. Upon the development of a rapid flow of water down the pipe 21 and out the valve port 24, the current lifts the ball 25, seals the port, and thus suddenly closes the check valve. As the water flow ceases upon the closing of the check valve 22, the ball 25 sinks away from the port 24 and the current can again build up to the point where the check valve again closes. The cycle repeats automatically so long as water is spilled into the upper end of the pipe 21. It has been found that a suitable cyclic action is obtained in a pipe dimensioned as stated above with a valve port one and one-half inches in diameter and a silicone rubber ball weighing about twelve ounces.

The ram 13 also includes a generally vertical air compressing tube 27 fixed so as to open into the lower end of the pipe 21. Desirably, the tube 27 angles from the top of the pipe 21 in the direction of water flow. Each time the check valve 22 closes, the kinetic energy of the water flowing down the pipe 21 drives a column of water up the compressing tube 27. When the check valve 22 reopens and water flow resumes down the pipe, the water in the tube drops to its former level. Using a four-inch diameter compressing tube on the exemplary pipe described above, a water column stroke, indicated by the arrow 28, of about three feet is obtained. It has been found that better action, with less likelihood of debris fouling, results from angling the tube 27 with respect to the pipe 21 in the manner described.

Air control is obtained by a pair of one-way valves 31 at the upper end of the tube 27. In the preferred embodiment, the valves 31 take the form of flap or flutter valves 32 and 33 at the opposite ends of a length of tubing defining a chamber 34 whose midportion is joined to the top of the compressing tube 27. As a result of air pressures, the valve 32 swings open to admit air into the tubing or chamber 34, and the valve 33 closes, when the water column in the tube 27 drops. The valve 33 opens to discharge air under greater than atmospheric pressure, and the valve 32 closes, when the water column is driven up the tube 27.

The air supply generated by the ram 13 is directed from the chamber 34 to the accumulator tank 14 through the hose conduit 15. The accumulator tank cushions the air impulses delivered by the ram 13, and a substantially continuous air flow is therefore maintained through the hose conduit 16 to the buried perforated pipe 17. The latter is preferably formed of tough plastic for long, trouble-free life, and is folded so that air releasing perforations 35 are located with some uniformity beneath the area treated. Again, with reference to the specific dimensions referred to above, apparatus so proportioned can treat an area of about four thousand square feet.

In summary, it will be seen that the ram 13 cycles automatically so long as water is supplied to the upper end of the pipe 21. As the water flow down the pipe gains velocity, the ball 25 is carried upwardly until the valve port 24 suddenly closes. The kinetic energy of the water running down the pipe is dissipated, upon closing of the check valve 22, by forcing a column of water up the tube 27 thus delivering an air compressing stroke the length of the arrow 28. During the compressing stroke, the valve 32 closes and the valve 33 opens to direct the air from the chamber 34 through the hose conduit 15 to the accumulator tank 14. Upon dissipation of the kinetic energy of the water in the pipe 21, the ball 25 sinks away from the valve port 24, water flow is resumed down the pipe, and the column of water in the tube 27 drops to its normal level. This cycle is endlessly repeated.

Air from the tank 14 is directed through the hose conduit 16 to the preforated pipe 17 which is buried in the gravel bed 11 of the stream 12. Air bubbles up through the perforations 25 in the buried pipe 17 dislodging silt and aerating the gravel bed.

It will be apparent that the apparatus 10 is made up of economical subassemblies and can be economically installed. It will also be apparent that operation of the apparatus is quite economical since little or no power need be added to the natural water drop provided by the stream. Because of the simplicity of the apparatus, its operation is dependable and little maintenance or inspection activity is required, thus making the method and apparatus well suited for remote installations.

I claim as my invention:

1. A method of enhancing salmon spawning in a gravel spawning bed including the steps of generating a supply of air under greater than atmospheric pressure, directing the air from said supply beneath the gravel bed of a salmon spawning stream, and bubbling the air up through said gravel bed from a plurality of closely spaced points so as to aerate and agitate the stream bed to disperse silt and cleanse the gravel.

2. The method of claim 1 in which the step of generating a supply of air is performed by a hydraulic ram air compressor using the natural water flow of said stream.

3. Apparatus for enhancing salmon spawning in a gravel bed stream comprising, in combination, a long pipe inclined downwardly in a downstream direction, the upper end of said pipe being positioned to receive water from said stream, a check valve in the lower end of said pipe for closing the lower end of the pipe only in response to rapid water flow through the pipe, a generally vertical compressing tube opening into the lower end of said pipe and having a chamber at its upper end, a pair of one-way valves in said chamber, the first of said pair of valves opening to admit air into the tube when the water level drops therein and the second of said valves opening to exhaust air from said tube when the water level rises therein, an air accumulator tank in communication with said second valve to receive air therethrough, a length of perforated pipe buried in the gravel of the stream bed so that the perforations are distributed through a spawning area to be treated, and a conduit coupling said tank with said perforated pipe.

4. The combination of claim 3 in which said check valve includes an upturned portion of said pipe with an upwardly opening valve port and a resilient ball in said portion adapted to be carried up by water flow so as to seal said port.

5. The combination of claim 3 in which said tube is angled from the top of said pipe in the water flow direction.

6. The combination of claim 3 in which said pair of one-way valves are flutter valves mounted at the opposite ends of said compressing chamber.

References Cited

UNITED STATES PATENTS

| | | | |
|---|---|---|---|
| 4,328 | 12/1845 | Benson | 103—79 |
| 136,834 | 3/1873 | Holton | 119—3 |
| 180,085 | 7/1876 | Wilmot | 119—3 |
| 758,259 | 4/1904 | Kline | 103—79 |
| 1,285,629 | 11/1918 | Crowe | 103—77 |
| 2,552,261 | 5/1951 | Coughlin | 119—5 X |
| 2,636,473 | 4/1953 | Schwartz et al. | 119—5 |
| 2,822,329 | 2/1958 | Griffith | 119—3 X |

ALDRICH F. MEDBERY, Primary Examiner

U.S. Cl. X.R.

103—77